United States Patent
Kojima et al.

(10) Patent No.: US 7,363,275 B2
(45) Date of Patent: Apr. 22, 2008

(54) ACCESS RIGHT CONTRADICTION DETECTION APPARATUS AND ANALYSIS RULE CREATION APPARATUS

(75) Inventors: Hisashi Kojima, Kawasaki (JP); Satoru Torii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 705 days.

(21) Appl. No.: 10/268,963

(22) Filed: Oct. 11, 2002

(65) Prior Publication Data
US 2003/0120603 A1    Jun. 26, 2003

(30) Foreign Application Priority Data
Dec. 20, 2001    (JP)    ............................. 2001-388587

(51) Int. Cl.
   *G06Q 99/00*    (2006.01)
(52) U.S. Cl. .............................. 705/54; 713/176; 707/9
(58) Field of Classification Search ............ 705/50–57, 705/59, 64–67, 74–75; 713/167–180; 380/201; 707/9–10; 726/1–36
See application file for complete search history.

(56) References Cited

U.S. PATENT DOCUMENTS

| | | | | |
|---|---|---|---|---|
| 5,983,225 A * | 11/1999 | Anfindsen | ...................... | 707/8 |
| 5,983,348 A | 11/1999 | Ji | | |
| 6,032,216 A * | 2/2000 | Schmuck et al. | ........... | 710/200 |
| 6,092,194 A | 7/2000 | Touboul | | |
| 6,205,466 B1 * | 3/2001 | Karp et al. | .................. | 718/104 |
| 6,317,868 B1 | 11/2001 | Grimm et al. | | |
| 6,466,983 B1 * | 10/2002 | Strazza | ........................ | 709/227 |
| 6,625,603 B1 * | 9/2003 | Garg et al. | ...................... | 707/9 |
| 6,889,209 B1 * | 5/2005 | Rabin et al. | ................... | 705/57 |
| 2001/0010045 A1 * | 7/2001 | Stefik et al. | ................... | 705/51 |
| 2001/0021926 A1 * | 9/2001 | Schneck et al. | .............. | 705/54 |
| 2002/0099952 A1 * | 7/2002 | Lambert et al. | .............. | 713/200 |
| 2003/0115147 A1 * | 6/2003 | Feldman et al. | .............. | 705/64 |
| 2003/0131073 A1 * | 7/2003 | Lucovsky et al. | .......... | 709/219 |
| 2003/0188183 A1 * | 10/2003 | Lee et al. | .................... | 713/200 |

OTHER PUBLICATIONS

Kiely, "Secure NT apps", Informationweek, n667, pp. 1A-4A, Feb. 2, 1998, ISSN: 8750-6874.*
Jensen et al., "Verification of Control Flow Based Security Properties", May 9, 1999, Proceedings of the 1999 IEEE Symposium on Security and Privacy, Oakland, CA, May 9-12, 1999, Proceedings of the IEEE Symposium on Security and Privacy, Los Alamitos, CA, IEEE Comp. Soc., US, pp. 89-103.
Wallach et al., "Understanding Java Stack Inspection", Proceedings of the 1998 IEEE Symposium on Security and Privacy, Oakland, CA, May 3-6, 1998, IEEE Symposium on Security and Privacy, Los Alamitos, CA, IEEE Computer Soc, US, vol. CONF. 19, May 3, 1998, pp. 52-63.

(Continued)

*Primary Examiner*—Mary D. Cheung
(74) *Attorney, Agent, or Firm*—Staas & Halsey LLP

(57) ABSTRACT

Method signatures included in an input program are detected. An access analyzer sequentially analyzes the method signatures and obtains a run-time access right list based on a rule. This rule specifies method signatures and the access rights which may possibly be included in the program so that the method signatures correspond to the access rights, respectively. A comparator compares the run-time access right list with the design-time access right list in width of restriction based on another rule. This rule specifies widths related to restrictions of the access rights which may possibly be included in the program.

20 Claims, 16 Drawing Sheets

OTHER PUBLICATIONS

Gong et al., "Implementing Protection Domains in the Java™ Development Kit 1.2", Proceedings Internet Society Symposium on Network and Distributed System Security, Mar. 1988.

Gong et al., "Going Beyond the Sandbox: an Overview of the New Security Architecture in the Java™ Development Kit 1.2", Proceedings of the Usenix Symposium on Internet Technologies and Systems, Dec. 8, 1997, pp. 103-112.

* cited by examiner

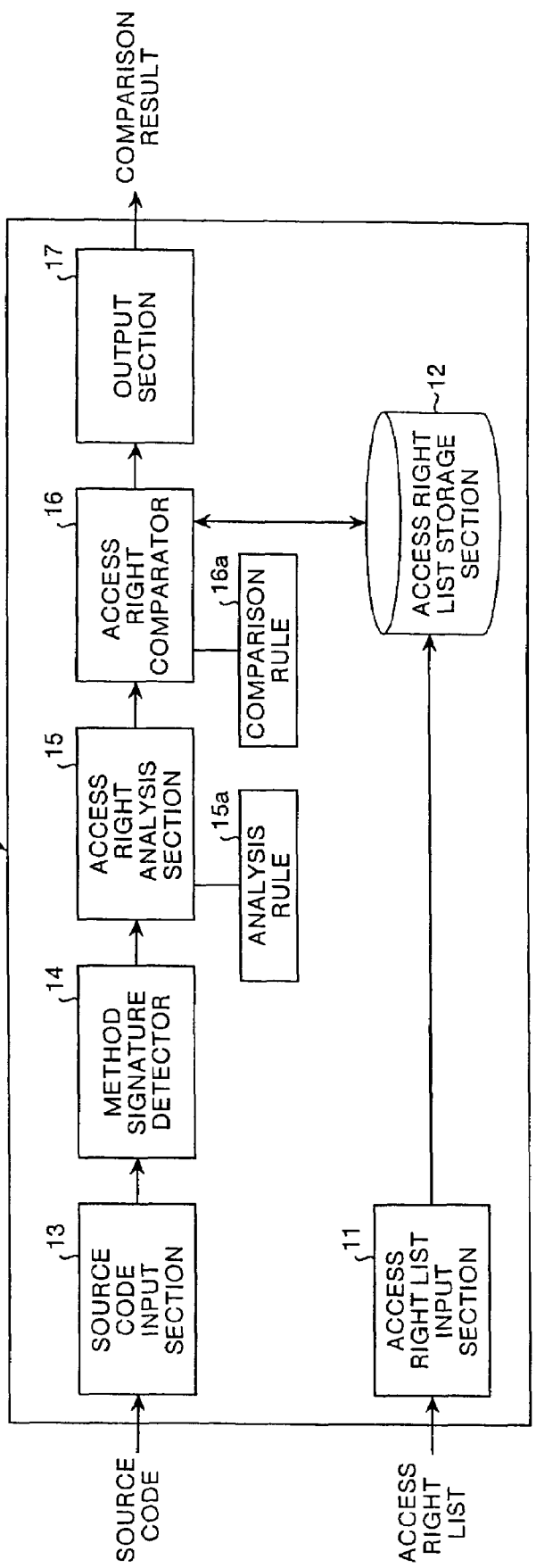

FIG.2

| SOURCE CODE | import java.io.*;<br>FileInputStream fis = new FileInputStream("/tmp/hoge"); |
|---|---|
| METHOD SIGNATURE | java.io.FileInputStream.FileInputStream(java.lang.String) |

FIG.3

| METHOD SIGNATURE | ACCESS RIGHT |
|---|---|
| java.lang.System.exit(int) | java.lang.RuntimePermission "exitVM" |
| java.security.Policy.getPolicy() | java.security.SecurityPermission "getPolicy" |
| java.lang.ThreadGroup.interrupt() | java.lang.RuntimePermission "modifyThreadGroup"<br>java.lang.RuntimePermission "modifyThread" |

FIG.4

```
●java.io.FileInputStream.FileInputStream(java.lang.String)・・・[METHOD SIGNATURE]
○Str IS AN ARBITRARY CHARACTER STRING・・・[PARAMETER IN SOURCE CODE]
import java.io.*;
new FileInputStream(str)
 ->java.io.FilePermission " 《ALL FILES》 ", "read"・・・[ACCESS RIGHT①]
new FileInputStream("/tmp/hoge")
 ->java.io.FilePermission "/tmp/hoge", "read"・・・[ACCESS RIGHT②]
new FileInputStream("/tmp/"+str)
 ->java.io.FilePermission "/tmp/-", "read"・・・[ACCESS RIGHT③]
```

FIG.5

● java.net.Socket.Socket(java.lang.String host, int port)····・[METHOD SIGNATURE]
○ str IS AN ARBITRARY CHARACTER STRING, num IS AN ARBITRARY INTEGER····・[PARAMETERS IN SOURCE CODE]
import java.net.*;
new Socket(str, num)
—> java.net.SocketPermission "*", "connect"····・[ACCESS RIGHT①]
new Socket(str + ".hogehoge.net", num)
—> java.net.SocketPermission "*.hogehoge.net", "connect"····・[ACCESS RIGHT②]
new Socket(str, 80)
—> java.io.SocketPermission "*:80", "connect"····・[ACCESS RIGHT③]

FIG.6

| CLASS | RULE |
|---|---|
| java.security.AllPermission | ALL ACCESS RIGHTS ARE INCLUDED |
| java.lang.RuntimePermission | ○ IF COMPARISON OBJECT IS IN "java.lang.RuntimePermisson" AND TARGET IS SAME, RESTRICTION WITH IS EQUAL, OTHERWISE, NOT EQUAL.<br>○ IF COMPARISON OBJECT IS IN "java.security.AllPermisson", ACCESS RIGHT IS INCLUDED IN "java.security.AllPermission".<br>○ IF COMPARISON OBJECT IS IN CLASS OTHER THAN "java.lang.RuntimePermission", RESTRICTION WITH IS NOT EQUAL. |
| java.io.FilePermission | ○ IF COMPARISON OBJECT IS IN "java.io.FilePermission", COMPARISON RELATIONSHIP IS DETERMINED BY TARGET AND ACTION.<br>"java.io.FilePermission"*", "read"",<br>> "java.io.FilePermission"/tmp/hoge", "read"",<br>"java.io.FilePermission"/tmp/hoge", "read,write""<br>> "java.io.FilePermission"/tmp/hoge", "read""<br>○ IF COMPARISON TARGET IS IN "java.security.AllPermission", ACCESS RIGHT IS INCLUDED IN "java.security.AllPermission".<br>○ IF COMPARISON TARGET IS IN CLASS OTHER THAN "java.io.FilePermission", RESTRICTION WITH IS NOT EQUAL. |

| ACCESS RIGHTS GRANTED IN ADVANCE | java.io.FilePermission "/tmp/hoge", "read"··· · · ① <br> java.io.RuntimePermission "exitVM"··· · · ② |
|---|---|
| ANALYZED ACCESS RIGHTS | java.io.FilePermission "*", "read"··· · · ③ <br> java.io.RuntimePermission "exitVM"··· · · ④ |
| COMPARISON RESULT | java.io.FilePermission "*", "read" <br> >java.io.FilePermission "/tmp/hoge", "read" |

FIG.10

| ACCESS RIGHTS GRANTED IN ADVANCE | java.io.FilePermission "/tmp/hoge", "read"····①<br>java.io.FilePermission "/tmp/*", "read"····② |
|---|---|
| COMPRESSED ACCESS RIGHT | java.io.FilePermission "/tmp/*", "read" |

FIG.12

| ANALYZED ACCESS RIGHTS | java.net.SocketPermission "www.hogehoge.net:80", "connect"···· ① <br> java.net.SocketPermission "*:80", "connect"···· ② |
|---|---|
| COMPRESSED ACCESS RIGHT | java.net.SocketPermission "*:80", "connect" |

FIG.14

| ACCESS RIGHT GRANTED IN ADVANCE | Java.io.FilePermission "/tmp/-", "read" |
|---|---|
| INPUT SOURCE CODE | 1:java.io.*;<br>2:<br>3:public class Sample {<br>4:<br>5:public InputStream foo(String file) {<br>6:return new FileInputStream(file);<br>7:}<br>8:<br>9:} |
| ANALYZED ACCESS RIGHT | java.io.FilePermission "⟨ALLFILES⟩", "read" |
| OUTPUT CONTENT (COMPARISON RESULT & PARTIAL SOURCE CODE) | Sample.java:6: violate java.io.FilePermission "/tmp/-", "read"<br>return new FileInputStream(file); |

FIG.16

| ANALYSIS RULE SPECIFIED IN ADVANCE | java.io.FileInputStream.FileInputStream(java.lang.String)⋯・[METHOD SIGNATURE]<br>java.io.FilePermission" 《ALL FILES》","read"⋯・[ACCESS RIGHT] |
|---|---|
| SOURCE CODE INPUT | 1:java.io.*;<br>2:<br>3:public class Sample {<br>4:<br>5:public InputStream foo(String file) {<br>6:return new FileInputStream(file);<br>7: }<br>8:<br>9: } |
| ANALYSIS RULE NEWLY CREATED | Sample.foo(java.lang.String)⋯・[METHOD SIGNATURE]<br>—>java.io.FilePermission" 《ALL FILES》","read"⋯・[ACCESS RIGHT] |

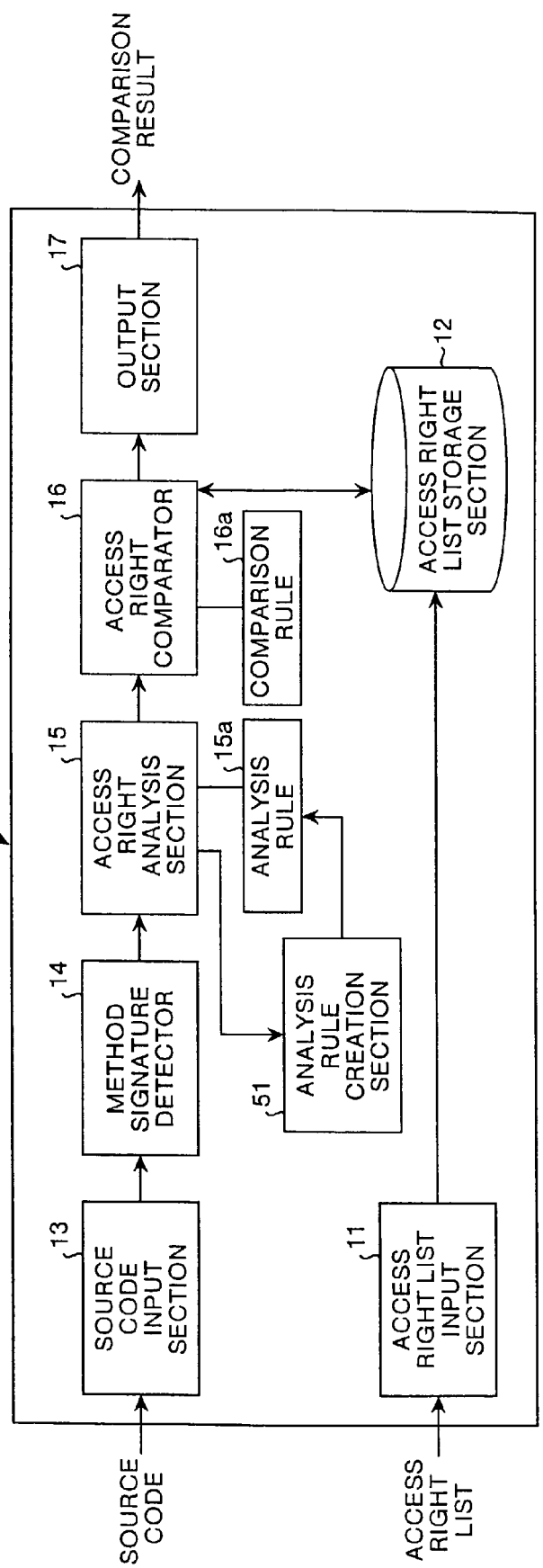

FIG.18

| ACCESS RIGHT | CONTENT |
|---|---|
| java.io.FilePermission "/tmp/hoge", "read" | PERMIT READING /tmp/hoge FILES |
| java.io.FilePermission "/home/hisashi/-", "read, write, execute" | PERMIT READING, WRITING AND EXECUTING ALL FILES AND DIRECTORIES UNDER /home/hisashi DIRECTORY |
| java.net.SocketPermission"localhost:1024-", "accept,connect,listen" | PERMIT ACCEPTANCE OF CONNECTION REQUEST, TRANSMISSION OF CONNECTION REQUEST, AND WAIT OF CONNECTION REQUEST |
| java.lang.RuntimePermission "exitVM" | PERMIT EXIT OF Java VIRTUAL MACHINE |

FIG.19

| METHOD | ACCESS RIGHT | CONTENT |
|---|---|---|
| java.io.FileInputStream.FileInputStream (String name) | java.io.FilePermission"{name}", "read" | READ FILE AND DIRECTORY EXPRESSED BY name |
| java.io.FileOutputStream.FileOutputStream (String name) | java.io.FilePermission"{name}", "write" | WRITE TO FILE AND DIRECTORY EXPRESSED BY name |
| java.net.Socket.Socket(String host, int port) | java.net.SocketPermission"{host}:{port}", "connect" | CONNECT HOST EXPRESSED BY host TO TCP PORT NUMBER EXPRESSED BY port |
| java.lang.System.exit(int status) | java.lang.RuntimePermission "exitVM" | END Java VIRTUAL MACHINE, AND RETURN STATUS CODE EXPRESSED BY status |

ACCESS RIGHT CONTRADICTION DETECTION APPARATUS AND ANALYSIS RULE CREATION APPARATUS

BACKGROUND OF THE INVENTION

1) Field of the Invention

This invention relates to an access right contradiction detection apparatus which detects a contradiction which occurs between a run-time access right list which is a collection of access rights which are used when a predetermined program to be executed based on the restriction of access rights is executed and a design-time access right list which is a collection of access rights which are granted when the program is designed, for the predetermined program, and an analysis rule creation apparatus which creates a predetermined analysis rule which is employed by the access right contradiction detection apparatus.

2) Description of the Related Art

In recent years, as network technology develops, programs that run on a software referred to as "a virtual machine" and which does not depend on a platform according to OS or type of the machine (computer) have become popular. Such programs include, for example, a Java program which is created in Java (a trademark) which is an object-oriented program language.

The Java program is characterized by being capable of exercising access control over file operation and network connection. Namely, the Java program controls access by defining access rights necessary to execute the programs which involve a risk of security such as the reading of a file and the connection to the network.

Specifically, as shown in FIG. 18, different classes of access rights are defined for types in accordance with expression formats which conform to the Java2 standard policy file and the access rights are strictly expressed according to targets and actions. For example, with access control "permit reading/tmp/hoge files", an access right "java.io.FilePermission"/tmp/hoge", "read"" is defined.

In addition, a program which involves a risk of security is executed to correspond to the calling of a specific method. Therefore, as shown in FIG. 19, predetermined access rights are given to correspond to methods which require access rights, respectively. For example, for a method "java.io.FileInputStream.FileInputStream (String name)", an access right "java.io.FilePermission"[name]", "read"" is given to correspond to the method.

If a method is called to execute a program, an access right which is authorized to a person who calls the method is referred to. As long as the person has an access right necessary to call the method, the person is permitted to execute the method. In this way, access control is exercised to each Java program based on the restriction of access rights when the program is executed.

Conventionally, a program execution test is conducted for a program to be executed based on the restriction of access rights so as not to cause a security exception between access rights which are used when the program is executed and access rights which are given when the program is designed.

Specifically, when the Java program is designed, access rights which the Java program requires are granted in advance and the program is created in view of the access rights thus granted in advance. However, for a Java program which is actually created, access rights to be used are not necessarily limited to those that are granted at the time of design because of packaging error or the like.

For example, if a user exercises an access right wider than the access right which is given at the time of designing a packaged Java program, a security exception occurs when executing the program. Namely, this includes an instance in that although an access right "permit reading/tmp/hoge files" is granted at the time of designing a program, an access right "permit reading all files" is exercised for a packaged Java program.

Under these circumstances, it is examined whether or not a contradiction (difference in the width of restriction) occurs between an access right to be used when a Java program is executed and that granted when the program is designed by conducting a program execution test. If this execution test detects any contradiction between the both access rights, the program is corrected to conform to the access right which is granted at the time of design to thereby eliminate a security exception.

Nevertheless, the conventional art has a disadvantage in that a contradiction which occurs between an access right used when a program is executed and that granted when the program is designed cannot be detected with high accuracy. In other words, according to the conventional art, an execution test is simply conducted to a program which is created in light of access rights which are granted when the program is designed and the result of the execution test does not always reflect on all contradictions. Therefore, even if an execution test is repeatedly conducted, there is a limit to the detection of all contradictions as a matter of course.

Accordingly, how to detect the contradiction which occurs between an access right used when a program is executed and that granted when the program is designed is quite an important problem to be solved. Not a method of repeatedly conducting an execution test but a method which enables easily, surely detecting a contradiction is desired.

SUMMARY OF THE INVENTION

It is an object of the present invention to provide an access right contradiction detection apparatus which can easily and surely detect a contradiction which occurs between an access right to be used when a program is executed and an access right granted when the program is designed. It is another object of the present invention to provide an analysis rule creation apparatus which automatically creates a predetermined analysis rule to be employed by the access right contradiction detection apparatus and which can improve efficiency in access right contradiction detection processing.

The access right contradiction detection apparatus according to one aspect of the present invention includes a detection unit that analyzes a source code of the program, and which sequentially detects method signatures which are included in the program, an analysis unit that sequentially analyzes the method signatures detected by the detection unit and obtains the run-time access right list based on a predetermined rule which specifies method signatures and the access rights which may possibly be included in the program so that the method signatures correspond to the access rights, respectively, a comparison unit that compares the run-time access right list, which is obtained by the analysis unit, with the design-time access right list in width of restriction based on a predetermined comparison rule which specifies widths related to restrictions of the access rights which may possibly be included in the program; and a notification unit that notifies a comparison result of the comparison unit.

The analysis rule creation apparatus according to another aspect of the present invention includes a detection unit that analyzes a source code of the program, and which sequentially detects the method signatures which are included in the program, an analysis unit that, if the method signatures which are detected by the detection unit are already specified by the predetermined analysis rule, analyzes the specified method signatures and obtains the access rights, and which, if the method signatures which are detected by the detection unit are not specified by the predetermined analysis rule but the method signatures which are specified by the predetermined analysis rule are called internally, analyzes the method signatures which are called internally and obtains the access rights, respectively, and an analysis rule creation unit that, if the analysis unit analyzes the method signatures which are called internally and obtains the access rights, respectively, creates a new analysis rule which specifies the obtained access rights and the method signatures which are detected by the detection unit so that the obtained access rights correspond to the detected method signatures, respectively.

The access right contradiction detection method according to still another aspect of the present invention includes a detection step of analyzing a source code of the program, and sequentially detecting method signatures which are included in the program, an analysis step of sequentially analyzing the method signatures detected at the detection step and obtaining the run-time access right list based on a predetermined rule which specifies method signatures and the access rights which may possibly be included in the program so that the method signatures correspond to the access rights, respectively, a comparison step of comparing the run-time access right list, which is obtained at the analysis step, with the design-time access right list in width of restriction based on a predetermined comparison rule which specifies widths related to restrictions of the access rights which may possibly be included in the program; and a notification step of notifying a comparison result at the comparison step.

The analysis rule creation method according to still another aspect of the present invention includes a detection step of analyzing a source code of the program, and sequentially detecting the method signatures which are included in the program, an analysis step of, if the method signatures which are detected at the detection step are already specified by the predetermined analysis rule, analyzing the specified method signatures and obtaining the access rights, and of, if the method signatures which are detected at the detection step are not specified by the predetermined analysis rule but the method signatures which are specified by the predetermined analysis rule are called internally, analyzing the method signatures which are called internally and obtaining the access rights, respectively, and an analysis rule creation step of, if the method signatures which are called internally are analyzed and the access rights are obtained, respectively at the analysis step, creating a new analysis rule which specifies the obtained access rights and the method signatures which are detected at the detection step so that the obtained access rights correspond to the detected method signatures, respectively.

The computer program according to still another aspect of the present invention realizes the methods according to the present invention on a computer.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 1 is a block diagram that shows the configuration of an access right contradiction detection apparatus according to a first embodiment.

FIG. 2 is a view that shows a concrete example of a method signature detection processing in the first embodiment.

FIG. 3 is a view that shows an example of the structure of information which is specified by an analysis rule.

FIG. 4 is a view that shows a concrete example of an access right analysis processing in the first embodiment.

FIG. 5 is a view that shows a concrete example of the access right analysis processing in the first embodiment.

FIG. 6 is a view that shows an example of the structure of information which is specified by a comparison rule.

FIG. 10 is a view that shows a concrete example of a compression processing in the second embodiment.

FIG. 12 is a view that shows a concrete example of a compression processing in the third embodiment.

FIG. 14 is a view that shows a concrete example of an output processing in the fourth embodiment.

FIG. 16 is a view that shows a concrete example of an analysis rule creation processing in the fifth embodiment.

FIG. 17 is a block diagram that shows the configuration of an access right contradiction detection apparatus according to a sixth embodiment.

FIG. 18 is a view that shows examples of access rights.

FIG. 19 is a view that shows correspondence examples of access rights and methods.

DETAILED DESCRIPTIONS

Figures 7, 8:
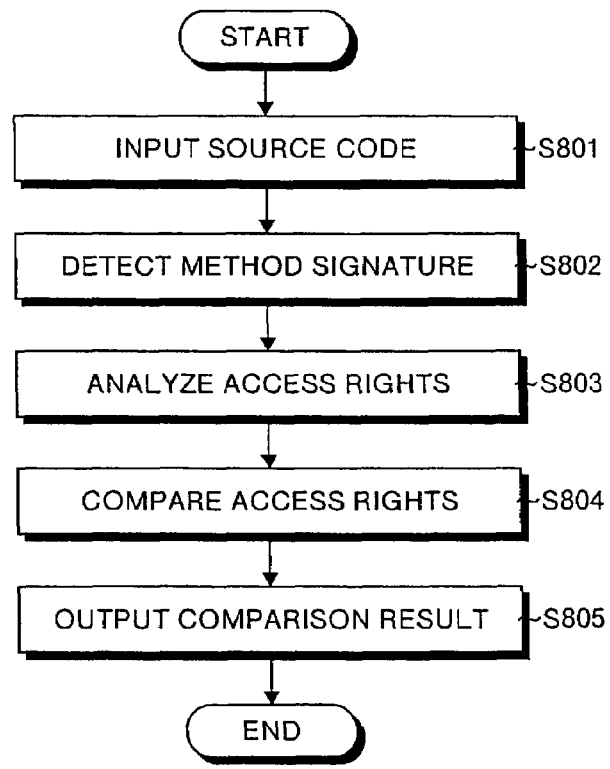
FIG. 7 is a view that shows a concrete example of a comparison result in the first embodiment.
FIG. 8 is a flowchart that explains procedures for an access right contradiction detection processing in the first embodiment.

Embodiments of an access right contradiction detection apparatus and an analysis rule creation apparatus according to this invention will be explained hereinafter in detail with reference to the accompanying drawings. In the following embodiments, instances of detecting an access right contradiction with respect to a Java program will be explained.

The outline and main features of an access right contradiction detection apparatus according to the first embodiment will first be explained. FIG. 1 is a block diagram that shows the configuration of the access right contradiction detection apparatus according to the first embodiment. The access right contradiction detection apparatus 10 shown in FIG. 1 is roughly intended to detect a contradiction which occurs between a run-time access right list which is a collection of access rights to be used when a Java program, which is executed based on the restriction of access rights, is executed, and a design-time access right list which is a collection of access rights granted when the Java program is designed for the Java program.

This access right contradiction detection apparatus 10 is mainly characterized by an access right contradiction detection processing. Specifically, the run-time access list is obtained from the source code of the program. Based on a predetermined rule which specifies the widths of restrictions of access rights which may possibly be included in the program, the run-time access right list is compared with the design-time access right list in width of restriction. By notifying the result of this comparison, the contradiction which occurs between an access right to be used when the program is executed and that granted when the program is designed can be easily, surely detected.

The configuration of the access right contradiction detection apparatus according to the first embodiment will next be explained. This access right contradiction detection apparatus 10 consists of an access right list input section 11, an access right list storage section 12, a source code input section 13, a method signature detector 14, an access right analysis section 15, an access right comparator 16 and an output section 17 as shown in FIG. 1.

Among these constituent elements, the access right list input section 11 is a processing section which inputs a design-time access right list which is a collection of access rights granted when a program is designed, into the access right contradiction detection apparatus 10. To be specific, the access right list input section 11 inputs data on a list of access rights as shown in FIG. 18.

The access right list storage section 12 is a memory which stores the design-time access right list which is input by the access right list input section 11. If a plurality of design-time access right lists are input by the access right list input section 11, ID information is allocated to each of the design time access list to unitarily specify the list and then stored in the access right storage section 12.

The source code input section 13 is a processing section which inputs the source code of the program into the access right contradiction detection apparatus 10. To be specific, the source code input section 13 inputs such source code data as those shown in FIGS. 2, 14 and 16. A program which forms basis for this source code is a program which is created in light of the design-time access right list.

The method signature detector 14 is a processing section which analyzes the source code of the program which is input from the source code input section 13 and which sequentially detects method signatures which are included in the program. To be specific, the method signature detector 14 analyzes the source code as a source code analyzer, detects a method call, and analyzes a method signature in the format of "type name.method name (parameter type name 1, parameter type name 2, . . . )" from the method call based on a method of specifying a call method according to Java language specification. It is assumed herein that dynamic binding is not considered.

This method signature detection processing will be specifically explained. FIG. 2 is a view that shows a concrete example of the method signature detection processing in the first embodiment. The method signature detector 14 detects, for example, a source code "import java.io.*; FileInputStream fis=new FileInputStream ("/tmp/hoge");" and detects a method signature "java.io.FileInputStream.FileInputStream (java.lang.String)" as shown in FIG. 2.

Returning to FIG. 1, the access right analysis section 15 is a processing section which sequentially analyzes method signatures detected by the method signature detector 14 and obtains a run-time access right list based on a predetermined analysis rule 15a. The analysis rule 15a to which the access right analysis section 15 refers is a memory which specifies method signatures which may possibly be included in the Java program and access rights while making the method signatures correspond to the access rights, respectively.

This analysis rule 15a will now be explained concretely. FIG. 3 is a view that shows an example of the structure of information which is specified by the analysis rule 15a. In Java, access right analysis rules are present for all the access rights which are defined as standards, respectively. According to an ordinary analysis rule, a corresponding access right is determined for each method signature.

Therefore, as shown in FIG. 3, the analysis rule 15a specifies the method signatures which may possibly be included in the Java program and the access rights so that the access rights correspond to the respective method signatures. For example, the analysis rule 15a specifies an access right "java.lang.RuntimePermission"exitVM"" to correspond to a method signature "java.lang.System.exit(int)".

Based on such an analysis rule 15a, the access right analysis section 15 sequentially analyzes method signatures and obtains access rights which correspond to the respective method signatures. At this moment, the access right analysis section 15 also determines access right parameters based on respective parameters which are set at the time of the method call for the access rights which have parameters, respectively. The access rights thus sequentially obtained are access rights to be used when the program is executed and a collection of these access rights is the run-time access right list.

This access right analysis processing will be explained concretely. FIGS. 4 and 5 are views that show concrete examples of the access right analysis processing in the first embodiment. Specifically, FIG. 4 shows a concrete example in which a method signature is "java.io.FileInputStream.FileInputStream (java.langString)" and a parameter is defined to the effect that "str is an arbitrary character string" in a source code.

That is, in this case, the access right analysis section 15 obtains an access right "java.io.FilePermission"parameter", "read"" which corresponds to the method signature "java.io.FileInputStream.FileInputStream (java.langString)" based on the analysis rule 15a. In addition, the access right analysis section 15 determines the parameter of the access right based on the respective parameters which are set at the time of the method call.

If the parameter of the access right is determined in view of "str is an arbitrary character string" and a source code on the parameter is, for example, "newFileInputStream(str)", then an access right "java.io.FilePermission" <<ALL FILE S>>, "read"" is obtained (see access right (1) shown in FIG. 4). Likewise, if a source code on the parameter is "newFileInputStream ("/tmp/hoge")", an access right "java.io.FilePermission"/tmp/hoge", "read" is obtained (see access right (2) shown in FIG. 4). If a source code on the parameter is "newFileInputStream ("/tmp/"+str)", an access right "java.io.FilePermission"/tmp/-", "read"" is obtained (see access right (3) shown in FIG. 4).

FIG. 5 shows a concrete example in which a method signature is "java.net.Socket.Socket(java.lang.String host, int port)" and a parameter is defined to the effect that "str is an arbitrary character string and num is an arbitrary integer" in a source code.

That is, in this case, the access right analysis section 15 obtains an access right "java.net.SocketPermission"parameter", "connect"" which corresponds to the method signature "java.io.FileInputStream.FileInputStream (java- .lang.String)" based on the analysis rule 15a. In addition, the access right analysis section 15 determines the parameter of the access right based on each parameter value set at the time of method call.

If the parameter of the access right is determined in view of "str is an arbitrary character string and num is an arbitrary integer" and a source code on the parameter is, for example, "new Socket(str,num)", then an access right "java.net.SocketPermission"*"", "connect"" is obtained (see access right (1) shown in FIG. 5). Likewise, if a source code on the parameter is "new Socket (str+".hogehoge.net",num)", an access right "java.net. SocketPermission"*.hogehoge.net", "connect"" is obtained (see access right (2) shown in FIG. 5). If a source code on the parameter is "new Socket (str, 80)", an access right "java.io.SocketPermission"*:80", "connect"" is obtained (see access right (3) shown in FIG. 5).

Further, if the method signature which is detected by the method signature detector 14 is not specified by the predetermined analysis rule 15a but the method signature which is specified by the predetermined rule 15a is called internally, the access right analysis section 15 analyzes the method signature which is called internally and obtains a run-time access right.

Referring now to FIG. 16, the analysis of an access right by the internal call of the method signature will be explained concretely. As shown in FIG. 16, it is assumed that a rule under which, for example, a method signature "java.io.FileInputStream.FileInputStream(java.lang.Stri ng)" corresponds to an access right "java.io.FilePermission"<<ALL FILES>>", "read"", is specified by the analysis rule 15a.

On the other hand, as shown in FIG. 16, in the source code which is input from the source code input section 13, a method "Sample.foo(java.lang.String)" which is defined on the fifth line calls the method signature "java.io.FileInputStream.FileInputStream(java.lang.Stri ng)" internally. In this case, the access right analysis section 15 analyzes the method signature "java.io.FileInputStream.FileInputStream (java.lang.Stri ng)" which is called internally and obtains an access right which corresponds to this method signature based on the analysis rule 15a although the access right which corresponds to the method "Sample.foo(java.lang.String)" is not specified by the analysis rule 15a.

That is, for the method signature "java.io.FileInputStream.FileInputStream(java.lang.Stri ng)" which is called internally, the access right "java.io.FilePermission"<<ALL FILES>>", "read"" is specified by the analysis rule 15a. Therefore, the access right analysis section 15 obtains the access right "java.io.FilePermission <<ALL FILES>>", "read"" as a run-time access right. As can be seen, by analyzing the access right by the internal call, it is possible to ensure obtaining a run-time access right.

Returning to FIG. 1, the access right comparator 16 is a processing section which compares the run-time access right list which is obtained by the access right analysis section 15 with the design-time access right list which is stored in the access right list storage section 12 in width of restriction based on a comparison rule 16a. The comparison rule 16a, to which this access right comparator 16 refers, is a memory which specifies widths of the restrictions of access rights which may possibly be included in the Java program.

This comparison rule 16a will be explained concretely. FIG. 6 is a view that shows an example of the structure of information which is specified by the comparison rule 16a. The comparison rule 16a specifies rules for the comparison between an access right with all other access rights in width of restriction for each access right classes (e.g., "java.io.FilePermission").

That is, as shown in FIG. 6, for a class "java.security.AllPermission", for example, a rule to the effect that "all access rights are included" is specified. For a class "java.lang.RuntimePermission", the following rules are specified. If "a comparison object is in "java.lang.RuntimePermisson" and a target is the same, restriction width is equal; otherwise, not equal. If a comparison object is in "java.security.AllPermission", the access right is included in "java.security.AllPermission". If a comparison object is in a class other than "java.lang.RuntimePermission", restriction width is not equal.

Further, for a class "java.io.FilePermission", the following rules are specified. If a comparison object is in "java.io.FilePermission", a comparison relationship is determined by a target and an action: "java.io.FilePermission"*", "read"">"java.io.FilePermission"/tmp/hoge", "read"" and "java.io.FilePermission"/tm/hoge", "read, write"">"java.io.FilePermission"/tmp/hoge", "read"". If a comparison object is in "java.security.AllPermission", the access right is included in "java.security.AllPermission". If a comparison object is in a class other than "java.io.FilePermission", restriction width is not equal.

Based on such a comparison rule 16a, the access right comparator 16 compares the run-time access right list with the design-time access right list in width of restriction. Specifically, the access right comparator 16 compares each of the access rights which are included in the run-time access right list with each of those that are included in the design-time access right list in the width of restriction. For example, if a run-time access right is "java.io.FilePermission"*", "read"" and a comparison object or the design time access right is "java.io.FilePermission"/tmp/hoge", "read"", the access right comparator 16 compares the both rights in width of restriction based on the comparison rule 16a and determines, as a comparison result, that "java.io.FilePermission"*", "read">java.io.FilePermission"/tmp/hoge", "read".

Returning to FIG. 1, the output section 17 is a processing section which notifies the comparison result of the access right comparator 16 to the outside of the access right contradiction detection apparatus 10. Specifically, this output section 17 consists of information output units such as a monitor, a printer and a loudspeaker. The output section 17 outputs a contradiction which occurs between the run-time access right list and the design-time access right list, i.e., outputs an access right in the run-time access right list which right is determined, by the comparison processing of the access right comparator 16, to be wider in restriction than the design-time access rights.

The comparison result which is output by this output section 17 will be explained concretely. FIG. 7 is a view that shows an example of the comparison result in the first embodiment. As shown in FIG. 7, it is assumed that access rights which are granted in advance (in the design-time access list) are an access right (1) "java.io.FilePermission"/tmp/hoge", "read"" and an access right (2) "java.io.RuntimePermission"exitVm"" and access rights which are analyzed (in the run-time access right list) are an access right (3) "java.io.FilePermission"*", "read"" and an access right (4) "java.io.RuntimePermission"exitVM"".

In this case, the access right comparator 16 determines, as a result of comparison, that the run-time access right (4) is equal to the design-time access right (2) but that the run-time access right (3) is wider in restriction than the design-time access right (1). Therefore, the output section 17 outputs, as a comparison result, "java.io.FilePermission"*"", "read">java.io.FilePermission"/tmp/hoge", "read"" as shown in FIG. 7.

The access right contradiction detection processing procedures in the first embodiment will next be explained. FIG. 8 is a flowchart that explains the access right contradiction detection processing procedures in the first embodiment. The procedures will be explained hereinafter on the assumption that the design-time access right list which is input by the access right list input section 11 is already stored in the access right list storage section 12.

As shown in FIG. 8, in the access right contradiction detection apparatus 10 according to the first embodiment, the source code input section 13 inputs the source code of a program into the access right contradiction detection apparatus 10 (step S801). The method signature detection apparatus 14 analyzes the source code of the program which is input from the source code input section 13 and sequentially detects method signatures which are included in the program (step S802) as shown in FIG. 2.

Thereafter, the access right analysis section 15 sequentially analyzes the method signatures which are detected by the method signature detector 14 based on the predetermined analysis rule 15a and obtains a run-time access right list as shown in FIGS. 4 and 5 (step S803). This access right analysis is not limited to that which is executed every time each method signature is detected by the method signature detector 14 in succession. Alternatively, the analysis of access rights may be sequentially executed after all the method signatures are detected.

The access right comparator 16 then compares the run-time access right list which is obtained by the access right analysis section 15 with the design-time access right list which is stored in the access right list storage section 12 in width of restriction based on the comparison rule 16a (step S804). This access right comparison, similarly to the access right analysis explained above, is not limited to that which is executed every time each run-time access rights is obtained in succession by the access right analysis section 15. Alternatively, the comparison of access rights may be sequentially executed after all the run-time access rights are obtained.

As shown in FIG. 7, the output section 17 outputs, as the comparison result of the access right comparator 16, a contradiction which occurs between the run-time access right list and the design-time access right list, i.e., outputs an access right in the run-time access right list which right is determined, by the comparison processing of the access right comparator 16, to be wider in restriction than the design-time access rights (step S805). This comparison result output, similarly to the access right analysis and the access right comparison explained above, is not limited to that which is executed every time the access right comparator 16 compares each of the run-time access rights with design-time accesses. Alternatively, comparison results may be output as a comparison result list after all of the run-time access rights are compared with the design-time access rights.

Through a series of processings explained above, the contradiction which occurs between the run-time access right list and the design-time access right list is clearly notified through the output section 17. This notified content assists in correcting the program so as to conform to the access rights which are granted at the time of designing the program.

As explained so far, according to the first embodiment, the method signature detector 14 analyzes the source code of the program which is input from the source code input section 13, and sequentially detects the method signatures which are included in the program. The access right analysis section 15 sequentially analyzes the method signatures thus detected based on the predetermined analysis rule 15a and obtains the run-time access right list. The access right comparator 16 compares the run-time access right list with the design-time access right list which is stored in the access right list storage section 12 in width of restriction based on the predetermined comparison rule 16a. The output section 17 notifies this comparison result. It is, therefore, possible to easily, surely detect a contradiction which occur between the access rights to be used when the program is executed and the access rights which are granted when the program is executed.

In the first embodiment, an example in which the design-time access right list which is input from the access right list input section 11 itself is a comparison object for the run-time access right list, has been explained. The present invention is not limited to this example. The present invention is also applicable to an example in which the design-time access right list which is input from the access right list input section 11 is edited to be compared with the run-time access right list.

Figure 9:
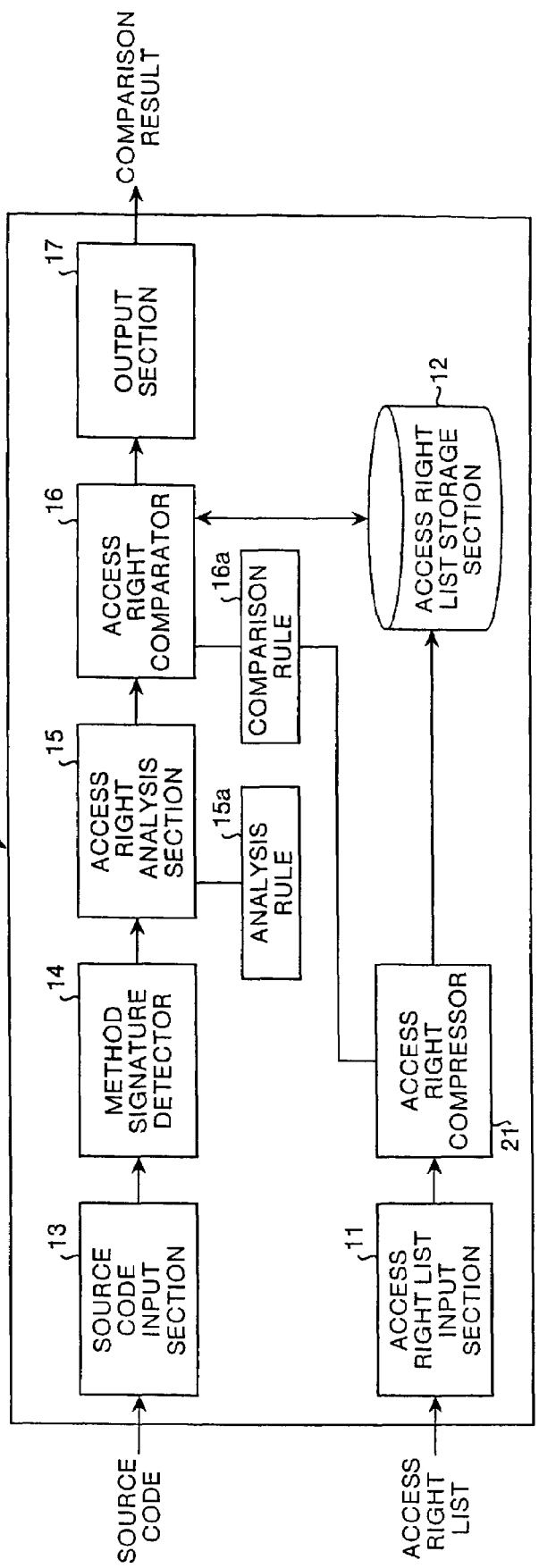
FIG. 9 is a block diagram that shows the configuration of an access right contradiction detection apparatus according to a second embodiment.

An example in which the design-time access right list which is input from the access right list input section 11 is edited will be explained as the second embodiment of the present invention. FIG. 9 is a block diagram that shows the configuration of an access right contradiction detection apparatus according to the second embodiment. It is noted that sections that have the same functions as those shown in FIG. 1 are denoted by the same reference symbols as those in FIG. 1, respectively and will not be explained in detail. An access right compressor 21, which is the characteristic section of the second embodiment, will only be explained in detail.

The access right compressor 21 in an access right contradiction detection apparatus 20 is a processing section which compares widths of restrictions of respective access rights which are included in a design-time access right list based on a predetermined rule 16a, and which creates a new design-time access right list (of compressed access rights) by deleting an access right narrower in restriction than the other access rights from the design-time access right list.

This compression processing will be explained concretely. FIG. 10 is a view that shows a concrete example of the compression processing in the second embodiment. As shown in FIG. 10, it is assumed that access rights which are granted in advance are, for example, an access right (1) "java.io.FilePermission"/tmp/hoge", "read"" and an access right (2) "java.io.FilePermission"/tmp/*", "read"".

In this case, the access right compressor 21 compares the access right (2) with the access right (1) based on the predetermined comparison rule 16a and determines that the former is wider in restriction than the latter. That is, the restriction content of the access right (1) is included in that of the access right (2). Therefore, the access right (2) is a redundant access right among those in the design-time access right list. Accordingly, the access compressor 21 creates a new design-time access right list by deleting the access right (2) from the design-time access right list (see FIG. 10).

It is noted that the new design-time access right list thus created is stored in an access right list storage section 12 and used by an access right comparator 16 as a comparison object for a run-time access right list.

As explained so far, according to the second embodiment, the access compressor 21 compares widths of restrictions of the respective access rights which are included in the design-time access right list based on the predetermined comparison rule 16a, and creates a new design-time access right list by deleting an access right narrower in restriction than the other access rights from the design-right access right list. The access right comparator 16 compares the newly created design-time access right list with the run-time access right list in width of restriction. It is, therefore, possible to efficiently compare access rights.

In the second embodiment, an example in which the design-time access right list which is input from the access right list input section 11 is edited, has been explained. The present invention is limited to this example. It is also possible to edit the run-time access right list which is obtained by the access analysis section 15.

Figure 11:
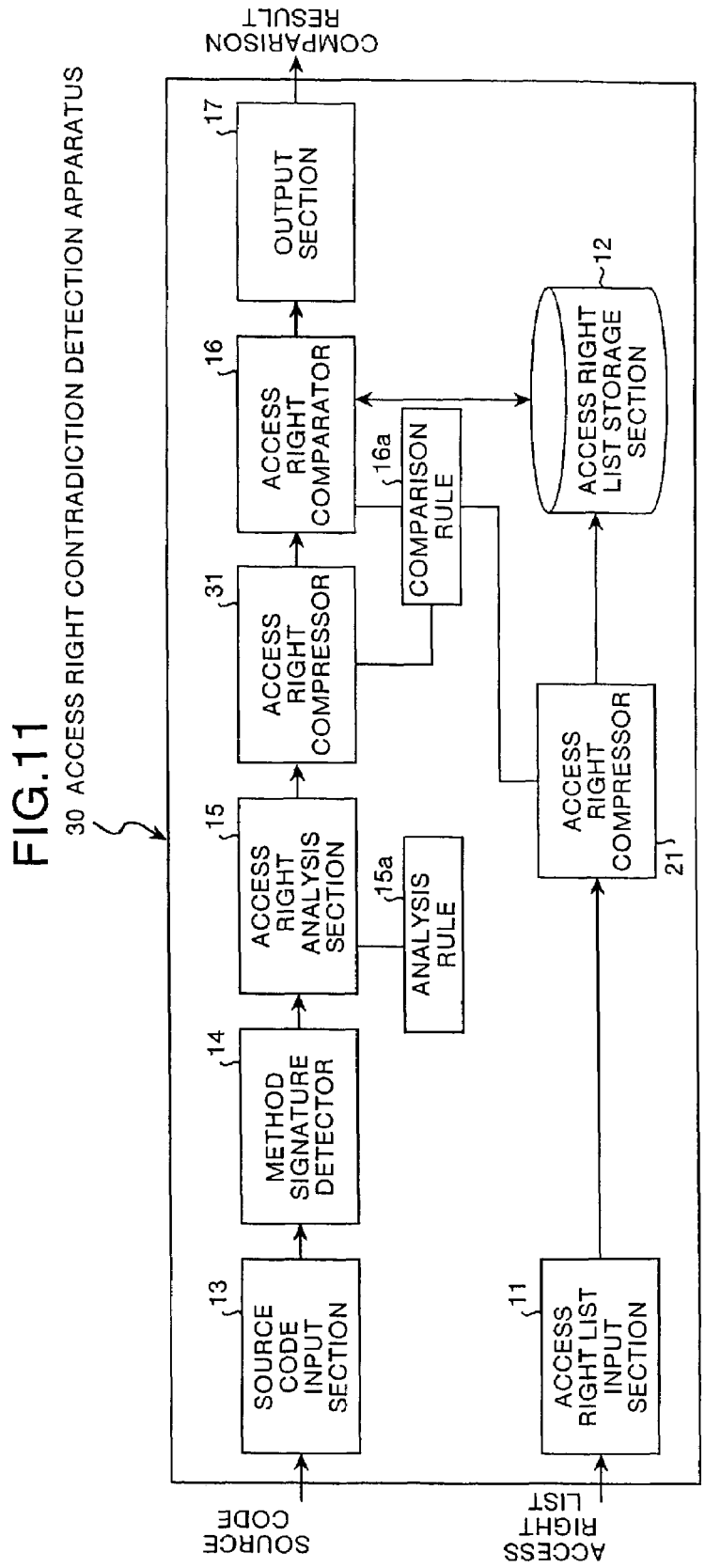
FIG. 11 is a block diagram that shows the configuration of an access right contradiction detection apparatus according to a third embodiment.

An example in which the run-time access right list which is obtained by the access analysis section 15 is edited will be explained here as the third embodiment of the present invention. FIG. 11 is a block diagram that shows the configuration of an access right list contradiction detection apparatus according to the third embodiment. It is noted that sections that have the same functions as those shown in FIGS. 1 and 2 are denoted by the same reference symbols as those in FIGS. 1 and 2, respectively and will not be explained in detail. An access right compressor 31, which is the characteristic section of the third embodiment, will only be explained in detail.

The access right compressor 31 in an access right contradiction detection apparatus 30 is a processing section which compares widths of restrictions of respective access rights which are included in the run-time access right list based on a predetermined rule 16a, and which creates a new run-time access right list (of compressed access rights) by deleting an access right narrower in restriction than the other access rights from the run-time access right list.

This compression processing is the same as that explained in the second embodiment, which will be explained concretely. As shown in FIG. 12, it is assumed that access rights (run time access right list) which are analyzed by an access right analysis section 15 are, for example, an access right (1) "java.net.SocketPermission"www.hogehoge.net:80", "connect"" and an access right (2) "java.net.SocketPermission"*: 80", "connect"".

In this case, the access right compressor 31 compares the access right (2) with the access right (1) based on the predetermined comparison rule 16a and determines that the former is wider in restriction than the latter. That is, the restriction content of the access right (1) is included in that of the access right (2). Therefore, the access right (2) is a redundant access right among those in the run-time access right list. Accordingly, the access compressor 31 creates a new run-time access right list by deleting the access right (2) from the run-time access right list (see FIG. 11).

It is noted that the new design-time access right list thus created is used by an access right comparator 16 as a comparison object for the design-time access right list. Namely, the access right comparator 16 compared the new run-time access right list which is created by the access right compressor 31 with the new design-time access right list which is created by the access right compressor 21 in width of restriction.

As explained so far, in the third embodiment, in addition to the creation of the new design-time access right list by the access right compressor 21, the access right compressor 31 compares widths of restrictions of the respective access rights which are included in the run-time access right list based on the predetermined comparison rule 16a, and creates the new run-time access right list by deleting an access right narrower in restriction than the other access rights from the run-right access right list. The access right comparator 16 compares the new design-time access right list with the new run-time access right list in width of restriction. It is, therefore, possible to further efficiently compare access rights.

Desirably, the compression processing is executed after all the run-time access rights are obtained by the access right analysis section 15. This is because if a compression processing is carried out after all the run-time access rights are obtained, it is considered to be able to surely, efficiently delete a redundant access right.

In the third embodiment, an example in which the access right compressor 31 creates the new run-time access right list in addition to the creation of the new design-time access right list by the access right compressor 21, has been explained. The present invention is not limited to this example. The present invention is also applicable to an example in which only the access right compressor 31 creates a new run-time access right list without providing the access right compressor 21. In this case, similarly to the third embodiment, it is possible to compare the access rights efficiently, compared with the first embodiment.

In the first to third embodiments, an example in which the access right which has a contradiction in width of restriction is output as the output of the comparison result of the output section 17, has been explained. However, the present invention is not limited to this example. It is also possible to output a source code which causes a contradiction.

Figure 13:
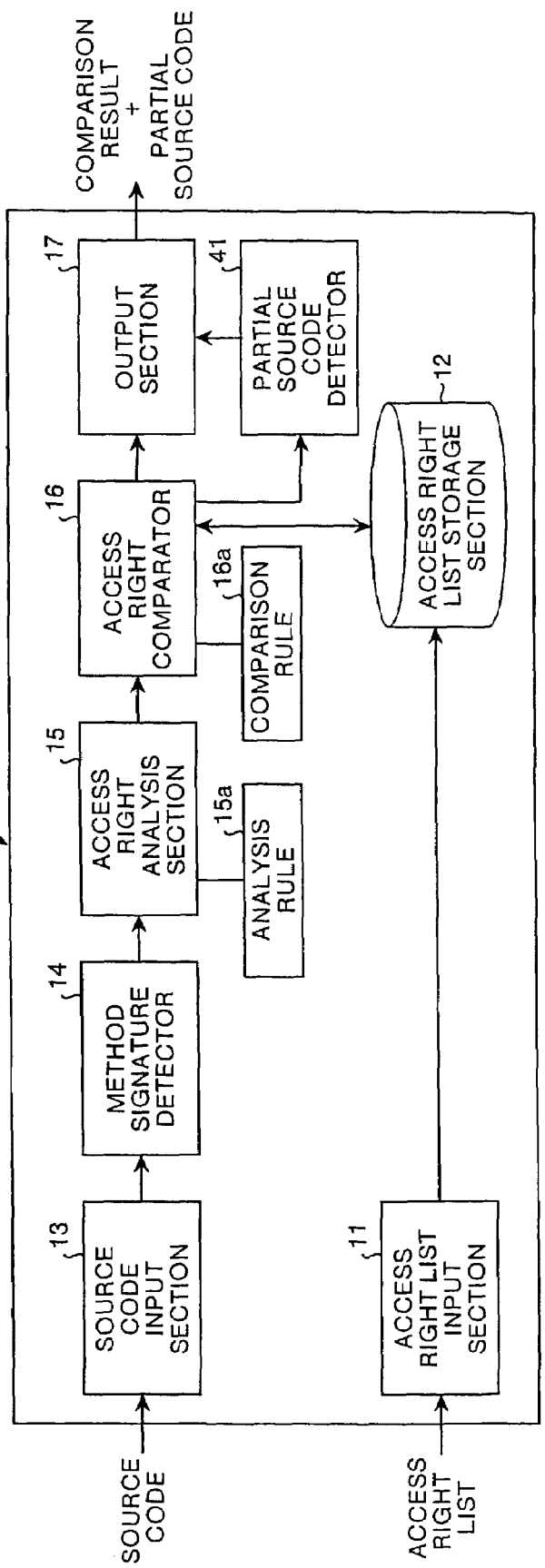
FIG. 13 is a block diagram that shows the configuration of an access right contradiction detection apparatus according to a fourth embodiment.

An example in which an output section 17 outputs a source code which causes the contradiction of access rights will be explained here as the fourth embodiment of the present invention. FIG. 13 is a block diagram that shows the configuration of an access right contradiction detection apparatus according to the fourth embodiment. It is noted that sections that have the same functions as those shown in FIG. 1 are denoted by the same reference symbols as those in FIG. 1, respectively and will not be explained in detail. Only a partial source code detector 41, which is a characteristic section of the fourth embodiment, will be explained in detail.

The partial source code detector 41 in an access right contradiction detection apparatus 40 is a processing section which detects a partial source code from source code of a program, which corresponds to an access right for which it is determined that the restriction of the run-time access is wider than that of a design-time access right as a result of the comparison by an access right comparator 16. An output section 17 outputs the partial source code which is detected by the partial source code detector 41.

This output processing will be explained concretely. FIG. 14 is a view that shows a concrete example of the output processing in the fourth embodiment. As shown in FIG. 14, it is assumed that an access right "Java.io.FilePermission"/tmp/–", "read"", for example, is stored, as the access right which is granted in advance (design-time access right), in an access right list storage section 12.

In this case, if a source code shown in FIG. 14 is input into a source code input section 13, an access right analysis section 15 obtains an access right "java.io.FilePermission"<<ALLFIlES>>", "read"" which results from a partial source code "new FileInputStream (file)" on the sixth line of the source code. The access right comparator 16 then compares each run-time access right which is obtained by the access right analysis section 15 with the design-time access right which is stored in the access right list storage section 12 in width of restriction. In this case, it is determined that the restriction of the run-time access right is wider than that of the design-time access right as a result of comparison. Namely, there is a contradiction in the widths of restrictions of access rights.

Therefore, the partial source code detector 41 detects the partial source code which causes the contradiction from the source code of the program. In this case, the partial source code detector 41 detects that "new FileInputStream (file)" on the sixth line of the source code causes the contradiction. The output section 17 outputs the contradictory access right and the partial source code which causes the contradiction as shown in FIG. 14.

As explained so far, according to the fourth embodiment, the partial source code detector 41 detects the partial source code which corresponds to the access right for which the restriction of the run-time access right is determined to be wider than that of the design-time access right as a result of the comparison by the access right comparator 16. The output section 17 notifies the partial source code thus detected. It is, therefore, possible to clearly notify the partial source code which causes a contradiction. It is thereby possible to facilitate correcting the program to conform to the access rights which are granted when the program is designed.

In the fourth embodiment, an example in which the compression of the design-time access right list and that of the run-time access right list as explained in the second and third embodiments are not executed, has been explained. However, the present invention is not limited to this/example. The present invention is also applicable to an example in which these compression processings are executed and then a partial source code which causes a contradiction is detected and output.

If the compression of the run-time access right list is executed, it is complicated to detect a partial source code which causes a contradiction by retroacting to the original run-time access right list from the new run-time access right. Therefore, it is considered to be preferable to execute only the compression of the design-time access right list.

In the first to fourth embodiments, an example in which the access rights are analyzed based on the analysis rule 15*a*, has been explained. Alternatively, this analysis rule 15*a* can be newly created by the same processing as the access right analysis processing carried out by the access right analysis section 15.

Figure 15:
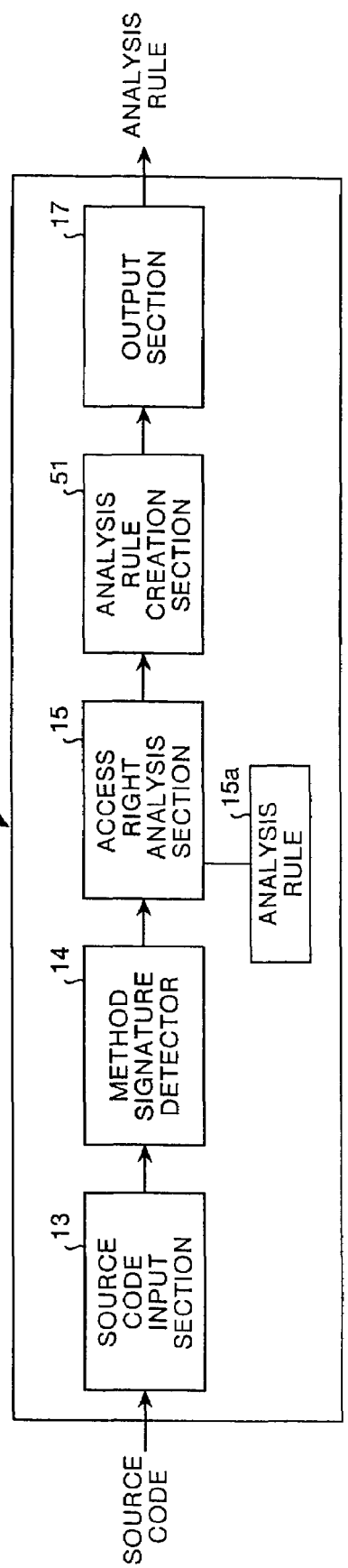
FIG. 15 is a block diagram that shows the configuration of an analysis rule creation apparatus according to a fifth embodiment.

An analysis rule creation apparatus which creates the analysis rule 15*a* which is used in each of the first to fourth embodiments will be explained here as the fifth embodiment of the present invention. FIG. 15 is a block diagram that shows the configuration of the analysis rule creation apparatus according to the fifth embodiment. As shown in FIG. 15, this analysis rule creation apparatus 50 consists of a source code input section 13, a method signature detector 14, an access right analysis section 15, an analysis rule creation section 51 and an output section 17.

Among these constituent elements, the source code input section 13, the method signature detector 14 and the access right analysis section 15 have the same functions as those that are explained in FIG. 1 and denoted by the same reference symbols, respectively. Namely, they analyze run-time access rights from the source code of a program.

Meanwhile, as explained in the first embodiment, if the method signature which is detected by the method signature detector 14 is already specified by the analysis rule 15*a*, the access right analysis section 15 analyzes the specified method signature and obtains an access right. If the method signature which is detected by the method signature detector 14 is not specified by the analysis rule 15*a* but the method signature which is specified by the predetermined analysis rule 15*a* is called internally, then the access right analysis section 15 analyzes the method signature called internally and obtains an access right.

The access right analysis by internally calling the method signature will be explained concretely. As shown in FIG. 16, it is assumed that a rule under which a method signature "java.io.FileInputStream.FileInputStream (java.lang.String)" corresponds to an access right "java.io.FilePermission"<<ALL FILES>>", "read"", for example, is specified by the analysis rule 15*a*.

On the other hand, in the source code which is input from the source code input section 13, as shown in FIG. 16, a method "Sample.foo(java.lang.String)" defined on the fifth line calls the method signature "java.io.FileInputStream.FileInputStream(java.lang.String)" internally. In this case, although an access right which corresponds to the method "Sample.foo(java.lang.String)" is not specified by the analysis rule 15*a*, the access right analysis section 15 analyzes the method signature "java.io.FileInputStream.FileInputStream (java.lang.String)" which is called internally and obtains an access right which corresponds to this method signature based on the analysis rule 15*a*.

That is, for the method signature "java.io.FileInputStream.FileInputStream(java.lang.String)" which is called internally, the access right "java.io.FilePermission"<<ALL FILES>>","read"" is specified by the analysis rule 15*a*. Therefore, the access right analysis section 15 obtains the access right "java.io.FilePermission"<<ALL FILES>>", "read"" as a run-time access right.

If the access right analysis is conducted by internally calling the method signature as explained above, it is an analysis rule creation section 51 shown in FIG. 15 that newly creates an analysis rule. Namely, if the access right analysis section 15 analyzes the method signature which is called internally and obtains an access right, the analysis rule creation section 51 creates a new analysis rule which specifies the access right thus obtained and the method signature so that they correspond to each other.

In the case shown in FIG. 16, for example, the analysis rule creation section 51 creates an analysis rule under which the method signature "Sample.foo(java.lang.String)" corresponds to the access right "java.io.FilePermission"<<ALL FILES>>", "read"". In addition, the output section 17 outputs the analysis rule which is created by the analysis rule creation section 51 to the outside of the analysis rule creation apparatus 50.

As explained so far, according to the fifth embodiment, if the access right analysis section 15 analyzes the method signature which is called internally and obtains an access right, the analysis rule creation section 51 creates a new analysis rule which specifies the access right thus obtained and the method signature thus detected so that they correspond to each other. It is, therefore, possible to create an efficient analysis rule which contributes to efficiently obtaining run-time access rights.

In other words, by specifying the analysis rule which is created by the analysis rule creation section 51 as the analysis rule 15*a* of the access right contradiction detection apparatus which has been explained in the first to fourth embodiment and the program is employed as, for example, a library, then it is possible to efficiently obtain run-time access rights. This is because it is unnecessary to call methods which are defined as standards according to Java and to perform analysis for the respective methods.

In the fifth embodiment, the analysis rule creation apparatus which creates the analysis rule 15a which is employed in each of the first to fourth embodiments has been explained. Alternatively, an access right contradiction detection apparatus can be constituted so that the function of such an analysis rule creation apparatus can be incorporated into the apparatus.

An access right contradiction detection apparatus which detects the contradiction of access rights while creating a new analysis rule will be explained here as the sixth embodiment of the present invention. FIG. 17 is a block diagram that shows the configuration of the access right contradiction detection apparatus according to the sixth embodiment. It is noted that sections that have the same functions as those shown in FIG. 1 are denoted by the same reference symbols as those in FIG. 1, respectively and will not be explained in detail. Only an analysis rule creation section 51, which is a characteristic section of the sixth embodiment, will be explained in detail.

The analysis rule creation section 51 in an access right contradiction detection apparatus 60 performs the same processings as those of the analysis rule creation section 51 which has been explained in the fifth embodiment. Namely, if the access right analysis section 15 analyzes the method signature which is called internally and obtains an access right, the analysis rule creation section 51 creates a new analysis rule which specifies the access right thus obtained and the method signature thus detected so that they correspond to each other.

Further, this analysis rule creation section 51 adds the newly created rule to the analysis rule 15a and specifies a new analysis rule. Therefore, the access right analysis section 15 can analyze access rights efficiently by referring to this new analysis rule, making it unnecessary to track the method calls defined as standards according to Java to perform analysis.

As explained so far, according to the sixth embodiment, if the access right analysis section 15 analyzes the method signature which is called internally and obtains an access right, the analysis rule creation section 51 creates a new analysis rule which specifies the access right thus obtained and the method signature thus detected so that they correspond to each other and adds the new analysis rule to the predetermined analysis rule 15a to thereby specify a new analysis rule. Therefore, it is possible to efficiently obtain run-time access rights shortly after the new analysis rule is added.

The embodiments of the present invention have been explained so far. The present invention may be carried out in various other embodiments within the scope of the technical concept which is described in the claims besides the embodiments explained above.

In the embodiments of the present invention, an example in which the contradiction of access rights is detected with respect to a Java program is explained. However, the present invention is not limited to this example. The present invention is also applicable to any program which is executed based on the restriction of access rights.

Further, among the respective processings which have been explained in the embodiments of the present invention, all of or a part of those which, it has been explained that, are automatically carried out, can be manually carried out. All of a part of those which, it has been explained that, are manually carried out, can be automatically carried out by a well-known method. Besides, the processing procedures, control procedures, concrete names, information which includes various data and parameters as shown in the specification or drawings can be arbitrarily changed unless specified otherwise.

Moreover, the respective constituent elements of each of the apparatuses shown in the drawings are functionally conceptual and are not necessarily constituted physically as shown in the drawings. That is, the concrete embodiments of the distribution and integration of the constituent elements in the respective apparatuses are not limited to those shown in the drawings. All of or a part of the constituent elements can be constituted to be distributed or integrated functionally or physically in arbitrary units, depending on various loads and a utilization condition. Further, all of or an arbitrarily part of the respective processing functions which are carried out by each apparatus can be realized by a CPU and a program which is analyzed and executed by the CPU. Alternatively, they can be realized as hardware based on wired logic.

Each of the access right contradiction detection methods and analysis rule creation methods explained in the embodiments of the present invention can be realized by allowing a computer, such as a personal computer or a workstation, to execute a program prepared in advance. This program can be distributed through the network such as the Internet. Alternatively, this program can be executed by recording the program on a computer readable recording medium such as a hard disk, a flexible disk (FD), a CD-ROM, an MO or a DVD, and reading the program from the recording medium by a computer.

As explained so far, according to one aspect of the present invention, a source code of a program is analyzed and method signatures which are included in the program are sequentially detected; the method signatures detected are sequentially analyzed and a run-time access right list is obtained based on a predetermined analysis rule which specifies method signatures and the access rights which may possibly be included in the program so that the method signatures correspond to the access rights, respectively; the run-time access right list is compared with the design-time access right list in width of restriction based on a predetermined comparison rule which specifies widths related to restrictions of the access rights which may possibly be included in the program; and this comparison result is notified. It is, therefore, possible to easily, surely detect a contradiction which occur between the access rights to be used when the program is executed and the access rights which are granted when the program is executed.

Furthermore, one of the access rights in the run-time access right list, for which access right it is determined that the restriction given when the program is executed is wider than the restriction given when the program is designed as a result of comparison is notified. It is, therefore, possible to assist in correcting the program to conform to the access rights which are granted when the program is designed.

Moreover, a partial source code which corresponds to the access right for which it is determined that the restriction given when the program is executed is wider than the restriction given when the program is designed as a result of the comparison, is detected from the source code of the program, and the detected partial source code is notified. It is, therefore, possible to clearly notify a partial source code which causes a contradiction. It is thereby possible to facilitate correcting the program to conform to the access rights which are granted when the program is designed.

Furthermore, the access rights which are included in the design-time access right list are compared with one another in width of restriction based on the predetermined comparison rule, and a new design-time access right list is created by deleting the access right which is narrower in restriction than the other access rights from the design-time access right, and the new design-time access right list thus created is compared with the run-time access right list in width of restriction. It is, therefore, possible to promptly detect a contradiction which occurs between the access right used when the program is executed and that granted when the program is designed.

Moreover, the access rights which are included in the run-time access right list are compared with one another in width of restriction based on the predetermined comparison rule, and a new run-time access right list is created by deleting the access right which is narrower in restriction than the other access rights from the run-time access right list, and the new run-time access right list thus created is compared with the design-time access right list in width of restriction. It is, therefore, possible to efficiently compare access rights. It is thereby possible to promptly detect a contradiction which occurs between the access right used when the program is executed and that granted when the program is designed.

Furthermore, the access rights which are included in the design-time access right list are compared with one another in width of restriction based on the predetermined comparison rule, and a new design-time access right list is created by deleting the access right which is narrower in restriction than the other access rights from the design-time access right, the access rights which are included in the run-time access right list are compared with one another in width of restriction based on the predetermined comparison rule, a new run-time access right list is created by deleting the access right which is narrower in restriction than the other access rights from the run-time access right list, and the new design-time access right list is compared with the new run-time access right list in width of restriction. It is, therefore, possible to further efficiently compare access rights. It is thereby possible to further promptly detect a contradiction which occurs between the access right used when the program is executed and that granted when the program is designed.

Moreover, if the method signatures which are detected are not specified by the predetermined analysis rule but the method signatures which are specified by the predetermined analysis rule are called internally, the method signatures which are called internally are analyzed and the run-time access rights are obtained, respectively. It is, therefore, possible to obtain run-time access rights from the source code of the program. It is thereby possible to further ensure detecting a contradiction which occurs between the access right used when the program is executed and that granted when the program is designed.

Furthermore, if the method signatures called internally are analyzed and the run-time access rights are obtained, respectively, and a new analysis rule which specifies the obtained access rights and the detected method signatures so that the obtained access rights correspond to the detected method signatures, respectively is created. It is, therefore, possible to create an efficient analysis rule which contributes to efficiently obtaining run-time access rights.

Moreover, if a new analysis rule is created, the new analysis rule is added to the predetermined analysis rule to specify the new analysis rule-added analysis rule. Therefore, it is possible to efficiently obtain run-time access rights shortly after the new analysis rule is added.

According to another aspect of the present invention, a source code of the program is analyzed and the method signatures which are included in the program are sequentially detected; if the detected method signatures are already specified by the predetermined analysis rule, the specified method signatures are analyzed and the access rights are obtained, and if the method signatures which are detected are not specified by the predetermined analysis rule but the method signatures which are specified by the predetermined analysis rule are called internally, the method signatures which are called internally are analyzed and the access rights are obtained, respectively; and if the method signatures which are called internally are analyzed and the access rights are obtained, respectively, a new analysis rule which specifies the obtained access rights and the detected method signatures so that the obtained access rights correspond to the detected method signatures, respectively is created. It is, therefore, possible to create an efficient analysis rule which contributes to efficiently obtaining run-time access rights.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An access right contradiction detection apparatus which detects, for a predetermined program which is executed based on access right restriction, a contradiction which occurs between a run-time access right list which is a collection of access rights used when the program is executed and a design-time access right list which is a collection of access rights granted when the program is designed, the apparatus comprising:

a detection unit that analyzes a source code of the program, and which sequentially detects method signatures which are included in the program;

an analysis unit that sequentially analyzes the method signatures detected by the detection unit and obtains the run-time access right list based on a predetermined rule which specifies method signatures and the access rights which may possibly be included in the program so that the method signatures correspond to the access rights, respectively;

a comparison unit that compares the run-time access right list, which is obtained by the analysis unit, with the design-time access right list in width of restriction based on a predetermined comparison rule which specifies widths related to restrictions of the access rights which may possibly be included in the program;

a notification unit that notifies a comparison result of the comparison unit; and an access right compressor deleting an access right narrower in restriction than other access rights from the design-time access right list to create a new design-time access right list.

2. The access right contradiction detection apparatus according to claim 1, wherein the notification unit notifies one of the access rights in the run-time access right list, for which access right it is determined that the restriction given when the program is executed is wider than the restriction given when the program is designed as a result of comparison by the comparison unit.

3. The access right contradiction detection apparatus according to claim 1, further comprising:

a partial source code detection unit that detects a partial source code which corresponds to the access right for which it is determined that the restriction given when the program is executed is wider than the restriction given when the program is designed as a result of the comparison by the comparison unit, from the source code of the program, wherein the notification unit notifies the partial source code which is detected by the partial source code detection unit.

4. The access right contradiction detection apparatus according to claim 1, further comprising:

a first list creation unit that compares the access rights which are included in the design-time access right list with one another in width of restriction based on the predetermined comparison rule, which deletes the access right which is narrower in restriction than the other access rights from the design-time access right, and which creates a new design-time access right list, wherein the comparison unit compares the new design-time access right list, which is created by the first list creation unit, with the run-time access right list, which is obtained by the analysis unit, in width of restriction.

5. The access right contradiction detection apparatus according to claim 1, further comprising:

a second list creation unit that compares the access rights which are included in the run-time access right list with one another, in width of restriction based on the predetermined comparison rule, which deletes the access right which is narrower in restriction than the other access rights from the run-time access right, and which creates a new run-time access right list, wherein the comparison unit compares the new run-time access right list, which is created by the second list creation unit, with the design-time access right list in width of restriction.

6. The access right contradiction detection apparatus according to claim 1, further comprising:

a first list creation unit that compares the access rights which are included in the design-time access right list with one another, in width of restriction based on the predetermined comparison rule, which deletes the access right which is narrower in restriction than the other access rights from the design-time access right, and which creates a new design-time access right list; and a second list creation unit that compares the access rights which are included in the run-time access right list with one another in width of restriction based on the predetermined comparison rule, which deletes the access right which is narrower in restriction than the other access rights from the run-time access right, and which creates a new run-time access right list, wherein the comparison unit compares the new design-time access right list which is created by the first list creation unit with the new run-time access right list which is created by the second list creation unit in width of restriction.

7. The access right contradiction detection apparatus according to claim 1, wherein if the method signatures which are detected by the detection unit are not specified by the predetermined analysis rule but the method signatures which are specified by the predetermined analysis rule are called internally, the analysis unit analyzes the method signatures which are called internally and obtains the run-time access rights, respectively.

8. The access right contradiction detection apparatus according to claim 7, further comprising:

an analysis rule creation unit that, if the analysis unit analyzes the method signatures called internally and obtains the run-time access rights, respectively, creates a new analysis rule which specifies the obtained access rights and the method signatures which are detected by the detection unit so that the obtained access rights correspond to the detected method signatures, respectively.

9. The access right contradiction detection apparatus according to claim 8, further comprising:

an analysis rule addition unit that, if the analysis rule creation unit creates the new analysis rule, adds the new analysis rule to the predetermined analysis rule to specify the new analysis rule-added analysis rule.

10. An access right contradiction detection method of detecting, for a predetermined program which is executed based on access right restriction, a contradiction which occurs between a run-time access right list which is a collection of access rights used when the program is executed and a design-time access right list which is a collection of access rights granted when the program is designed, the method comprising:

a detection step of analyzing a source code of the program, and sequentially detecting method signatures which are included in the program;

an analysis step of sequentially analyzing the method signatures detected at the detection step and obtaining the run-time access right list based on a predetermined rule which specifies method signatures and the access rights which may possibly be included in the program so that the method signatures correspond to the access rights, respectively;

a comparison step of comparing the run-time access right list, which is obtained at the analysis step, with the design-time access right list in width of restriction based on a predetermined comparison rule which specifies widths related to restrictions of the access rights which may possibly be included in the program;

a notification step of notifying a comparison result at the comparison step; and an access right compressor deleting an access right narrower in restriction than other access rights from the design-time access right list to create a new design-time access right list.

11. The access right contradiction detection method according to claim 10, wherein at the notification step, one of the access rights in the run-time access right list, for which access right it is determined that the restriction given when the program is executed is wider than the restriction given when the program is designed as a result of comparison at the comparison step, is notified.

12. The access right contradiction detection method according to claim 10, further comprising:

a partial source code detection step of detecting a partial source code which corresponds to the access right for which it is determined that the restriction given when the program is executed is wider than the restriction given when the program is designed as a result of the comparison at the comparison step, from the source code of the program, wherein at the notification step, the partial source code which is detected at the partial source code detection step is notified.

13. The access right contradiction detection method according to claim 10, further comprising:

a first list creation step of comparing the access rights which are included in the design-time access right list with one another in width of restriction based on the predetermined comparison rule, deleting the access right which is narrower in restriction than the other access rights from the design-time access right, and creating a new design-time access right list, wherein at the comparison step, the new design-time access right list which is created at the first list creation step, is compared with the run-time access right list which is obtained at the analysis step in width of restriction.

14. The access right contradiction detection method according to claim 11, further comprising:

a second list creation step of comparing the access rights which are included in the run-time access right list with one another, in width of restriction based on the predetermined comparison rule, deleting the access right which is narrower in restriction than the other access rights from the run-time access right, and creating a new run-time access right list, wherein at the comparison step, the new run-time access right list which is created at the second list creation step is compared with the design-time access right list in width of restriction.

15. The access right contradiction detection method according to claim 10, further comprising:

a first list creation step of comparing the access rights which are included in the design-time access right list with one another in width of restriction based on the predetermined comparison rule, deleting the access right which is narrower in restriction than the other access rights from the design-time access right, and creating a new design-time access right list; and a second list creation step of comparing the access rights which are included in the run-time access right list with one another in width of restriction based on the predetermined comparison rule, deleting the access right which is narrower in restriction than the other access rights from the run-time access right, and creating a new run-time access right list, wherein at the comparison step, the new design-time access right list which is created at the first list creation step is compared with the new run-time access right list which is created at the second list creation step in width of restriction.

16. The access right contradiction detection method according to claim 10, wherein if the method signatures which are detected at the detection step are not specified by the predetermined analysis rule but the method signatures which are specified by the predetermined analysis rule are called internally, the method signatures which are called internally are analyzed and the run-time access rights are obtained, respectively at the analysis step.

17. The access right contradiction detection method according to claim 16, further comprising:

an analysis rule creation step of, if the method signatures called internally are analyzed and the run-time access rights are obtained, respectively at the analysis step, and of creating a new analysis rule which specifies the obtained access rights and the method signatures which are detected at the detection step so that the obtained access rights correspond to the detected method signatures, respectively.

18. The access right contradiction detection method according to claim 17, further comprising:

an analysis rule addition step of, if the new analysis rule is created at the analysis rule creation step, adding the new analysis rule to the predetermined analysis rule to specify the new analysis rule-added analysis rule.

19. A computer-readable recording medium that stores therein a computer program which instructs a computer to execute access right contradiction detection, for a predetermined program which is executed based on access right restriction, a contradiction which occurs between a run-time access right list which is a collection of access rights used when the program is executed and a design-time access right list which is a collection of access rights granted when the program is designed, the access right contradiction detection, comprising:

a detection step of analyzing a source code of the program, and sequentially detecting method signatures which are included in the program;

an analysis step of sequentially analyzing the method signatures detected at the detection step and obtaining the run-time access right list based on a predetermined rule which specifies method signatures and the access rights which may possibly be included in the program so that the method signatures correspond to the access rights, respectively;

a comparison step of comparing the run-time access right list, which is obtained at the analysis step, with the design-time access right list in width of restriction based on a predetermined comparison rule which specifies widths related to restrictions of the access rights which may possibly be included in the program;

a notification step of notifying a comparison result at the comparison step; and an access right compressor deleting an access right narrower in restriction than other access rights from the design-time access right list to create a new design-time access right list.

20. An access right contradiction detection apparatus which detects, for a predetermined program which is executed based on access right restriction, a contradiction which occurs between a run-time access right list which is a collection of access rights used when the program is executed and a design-time access right list which is a collection of access rights granted when the program is designed, the apparatus comprising:

a comparison unit that compares the run-time access right list with the design-time access right list in width of restriction based on a predetermined comparison rule which specifies widths related to restrictions of the access rights; and an access right compressor deleting an access right narrower in restriction than other access rights from the design-time access right list to create a new design-time access right list.

* * * * *

UNITED STATES PATENT AND TRADEMARK OFFICE
CERTIFICATE OF CORRECTION

| | | |
|---|---|---|
| PATENT NO. | : 7,363,275 B2 | Page 1 of 1 |
| APPLICATION NO. | : 10/268963 | |
| DATED | : April 22, 2008 | |
| INVENTOR(S) | : Hisashi Kojima et al. | |

It is certified that error appears in the above-identified patent and that said Letters Patent is hereby corrected as shown below:

Column 21, Line 8, change "11" to --10--.

Signed and Sealed this

Fifth Day of August, 2008

JON W. DUDAS
*Director of the United States Patent and Trademark Office*